June 4, 1968          W. B. GROTE          3,386,875

EXPANDABLE TIRE BUILDING BLADDER APPARATUS

Filed Jan. 8, 1965          2 Sheets-Sheet 1

INVENTOR.
WARREN B. GROTE

BY

*J.B. Holden*
ATTORNEY

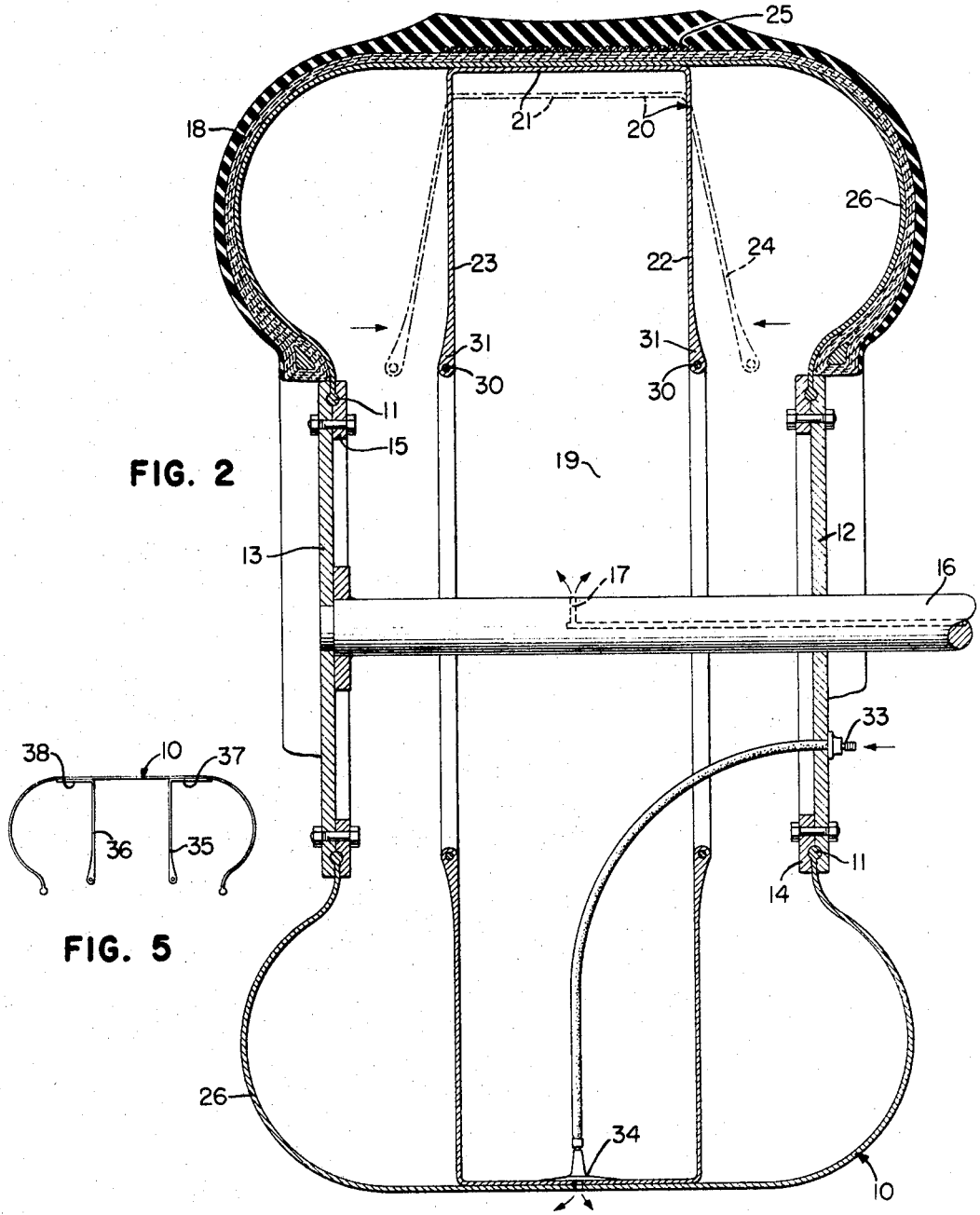

United States Patent Office 3,386,875
Patented June 4, 1968

3,386,875
EXPANDABLE TIRE BUILDING BLADDER APPARATUS
Warren B. Grote, Cuyahoga Falls, Ohio, assignor to The Goodyear Tire & Rubber Company, Akron, Ohio, a corporation of Ohio
Filed Jan. 8, 1965, Ser. No. 424,410
10 Claims. (Cl. 156—416)

ABSTRACT OF THE DISCLOSURE

An expansible bladder device for tire building apparatus comprising a fluid impervious bladder member having in unexpanded condition a generally cylindrical configuration and an inextensible bead ring at each of its ends adapted to be secured to a tire building drum end member, and at least one inner annular member disposed coaxially within the bladder and having one annular portion only attached to the bladder circumferentially intermediate its ends and having at a predetermined distance from said portion an inextensible bead ring, whereby the radial expansion of the bladder is restricted by said inner member.

---

This invention relates to an expansion bladder used in the production of tires and more particularly to a tire building and shaping bladder that facilitates the construction of very large diameter tires and apparatus utilized therewith.

The conventional method of building a pneumatic tire is carried out by assembling the layers of elastomeric material and the reinforcing media contained therein on a generally cylindrical tire building drum. The drum is usually rotatably mounted on a tire building machine so that its axis is in a horizontal position. Since the tire carcass must be built in a very compact manner it is only natural that the elastomeric material will adhere somewhat to the cylindrical surface of the tire building drum. For this reason tire building drums are conventionally constructed so that the diameter of the cylindrical surface of the drum can be varied. The variation of the cylindrical surface is achieved by mechanically actuated arcuate sectors or by means of a fluid actuated bladder superposed on the exterior of the tire building drum. It is not uncommon to employ both of the previously mentioned expedients in order to build in a satisfactory manner and also to free the cylindrically shaped green tire carcass from the drum upon which it was constructed.

With the advent of the radial ply tire a variation in the diameter of the building drum becomes even more important. It is customary during the construction of a radial ply tire to partially build the tire carcass in the cylindrical form then inflate the carcass so that the final reinforcement layers along with the exterior tread stock can be positioned on the carcass while it is near final toroidal configuration.

When reinforcement plies and rubber stock are added to an inflated uncured tire it is very difficult to inflate and maintain the tire carcass in the correct overall diameter. Also the inflated tire carcass is generally supported by a pressurized expansion means in the form of an air bag, or bladder. The air or fluid inflated bladder normally does not provide a rigid work surface as is inherent with the ordinary cylindrical tire building drum.

In the construction of huge off-the-road tires such as employed with earthmovers and rough terrain land vehicles as well as conventional passenger car tires it has been found practical to construct the tire partly in a cylindrical form then inflate the carcass for the remainder of the fabrication. Heretofore the inflation pressure utilized within the tire building bladder could not be incorporated to the point where a solid work surface was produced without causing too much curvature in the external portion of the bladder. This will be more fully explained elsewhere.

The primary object of this invention is to provide a tire building bladder that can be inflated from a cylindrical configuration to a toroidal configuration having a definite overall diameter that will be essentially constant throughout a wide range of inflation pressures.

Another object of the invention is to provide a tire building bladder that has attached to the interior surface thereof a radially extensible member that restricts the outward movement of the bladder when in the toroidal configuration.

An additional object of the present invention is to provide a tire building bladder that is equipped with an internal reinforcing member that maintains the radially outermost portion of the bladder in a predetermined contour when the bladder is extended.

A further object of the present invention is to provide a tire building bladder that can be inflated to the same external contour regardless of the internal pressure utilized.

A more detailed object of the instant invention is to provide an improved tire building bladder wherein the external configuration is controlled independent of the internal pressure by a flexible internally attached member that can assume essentially a cylindrical configuration when the bladder is in the uninflated condition and can move to a radially oriented tension carrying member when the bladder is in the inflated condition.

Further objects and advantages of the present invention will become apparent from the following description of the invention when taken with the accompanying drawings in which:

FIGURE 2 is a cross-section similar to FIGURE 1 except that the tire building bladder is in the expanded condition and contains an uncured tire carcass on the exterior, also shown in section.

FIGURE 4 is an enlarged cross-sectional view taken generally along a line such as 4—4 of FIGURE 3 which shows a preferred form of the construction utilized in joining together the components of the bladder of this invention.

FIGURE 5 is a schematic showing an embodiment different from that of FIGURE 2.

Figure 1:
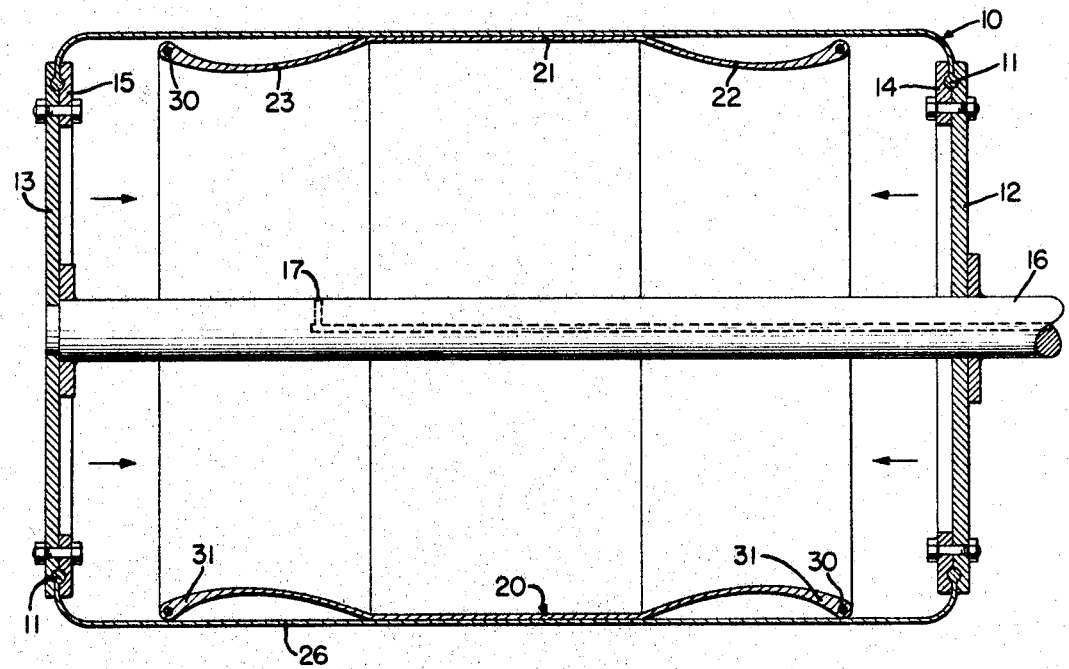
FIGURE 1 is a section taken along the axis of a tire building drum that shows the bladder in the unexpanded cylindrical configuration.

Tire building drums employing a cylindrical configuration are well known as are the machines for supporting and rotating them; therefore, the details of the structure other than the bladder will be held to a minimum since they are not considered part of this invention.

As has been stated before, a common method of shaping tires before vulcanization is by means of an elastomeric bladder which in turn is mounted on suitable tire building apparatus. The perimeter of a tire fabrication elastomeric bladder may be made extensible by using a reinforcement in the form of a fabric wire, or glass cord ply or plies incorporated in the elastomeric body of the bladder. The reinforcement cord direction is preferably radial although other cord attitudes can be utilized. The crown diameter of the inflated tire building bladder is regulated by the distance between the retaining rings which are normally part of the apparatus and located at the ends of the bladder. When the overall cross-sectional configuration of the tire is nearly semi-circular this arrangement works well. As the bladder is inflated the end retaining parts can move closer together in an axial direction thus permitting the bladder to expand radially into the familiar toroidal configuration. When tire configurations are other than semi-circular in cross-section the pressure within the bladder has to be regulated to permit, for example, the construction of a tire that is relatively flat across a rather wide area. A reduction in air pressure necessarily dictates a softer or less firm working surface for the construction of a tire carcass. Applicant has, with his newly invented tire building bladder, found a way in which any bladder contour can be duplicated time and again irrespective of fluctuations of pressure or temperature.

Referring now to the drawings the particular features of the invention will be pointed out along with selected components of a tire building machine that will aid in setting forth how the invention operates.

In FIGURE 1 the tire building bladder of this invention is shown generally at 10. Bladder 10 is of cylindrical configuration and is attached to a conventional tire building drum at beaded ends 11. Beads 11 are of thicker construction than the remainder of bladder 10 thus facilitating their anchorage in end plates 12 and 13. Clamping rings such as 14 and 15 serve to hold the thickened edge, or bead 11 of bladder 10, firmly in position on the tire building apparatus. While beads 11 are shown as arcuate bulbs, they may be square or of any other convenient cross-section. Bead holding end plate 12 is slidably mounted on shaft 16 which in turn is supported from the actuating mechanism of a tire building apparatus (not shown). Plate 13 is fixed to the end of shaft 16 thus permitting a rotating torque to be applied to bladder 10 during the building stage of a tire. Also shown in FIGURE 1 is an air ingress, line 17, that permits the inflation of bladder 10 by any convenient fluid such as air.

Normally a tire carcass is partially constructed in the cylindrical form on a collapsible tire building drum. The tire carcass is then removed from the initial building drum and positioned in a symmetrical fashion on a tire building bladder such as 10 in FIGURE 1.

After the partially complete cylindrical tire surface such as 18 in FIGURE 2 is positioned on bladder 10 a pressurized fluid is introduced into cavity 19 via inlet 17. Bladder 10 is thus expanded to the familiar toroidal configuration of a tire. Ordinarily the conventional bladder would, when expanded, form a hemispherical work surface adjacent the tread area of the tire. In many tires it is desirable to form the tread area so that it is cylindrical instead of hemispherical, or dome shaped. Applicant has discovered a way of definitely controlling the outermost contour of the tire building bladder in the following manner. On the interior of bladder 10 an additional bladder 20 is positioned so that its center section 21 is adhered to the interior of bladder 10. Bladder 20 has ends 22 and 23 that are free to assume generally a cylindrical configuration as shown in FIGURE 1. As bladder 10 is expanded in a radially outward direction under the influence of internal pressure within cavity 19, ends 22 and 23 move axially toward each other as can be seen in broken lines at 24. Ends 22 and 23 then assume a position normal to the axis of the tire and also bladder 10.

Bladder 10 is thus restricted in its radial growth as can be seen in FIGURE 2. The portions where bladders 10 and 20 are attached to one another become the work surface for the further application of reinforcement plies and breaker cords such as depicted at 25 of FIGURE 2.

Figure 3:
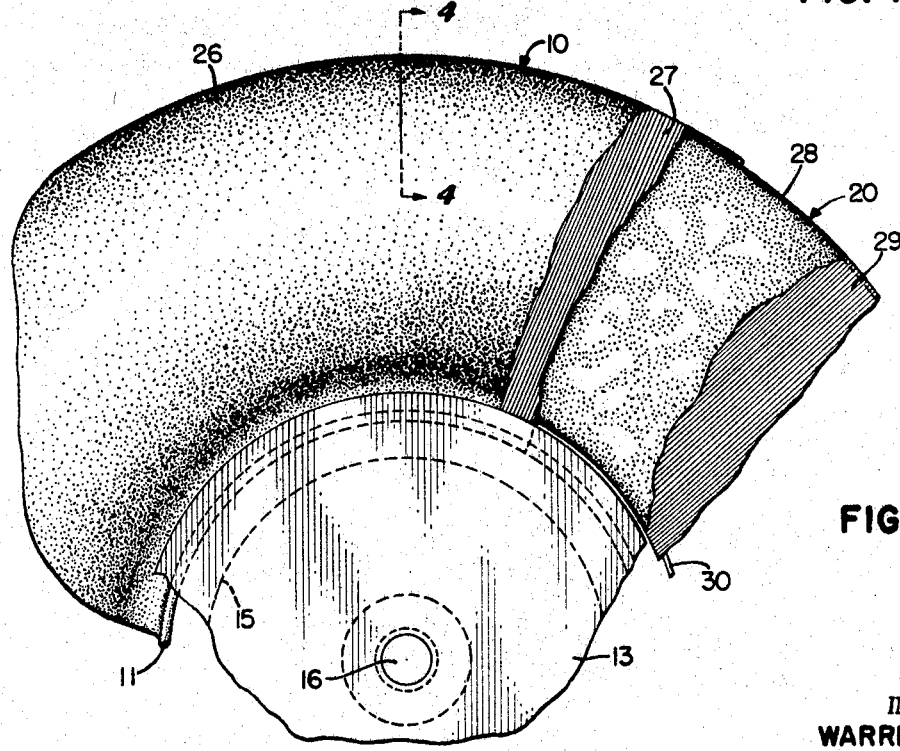
FIGURE 3 is a front elevational view of the tire building drum and bladder as seen from the left side of FIGURE 2.

The actual construction of bladders 10 and 20 is shown in the elevational view of FIGURE 3. Sidewall 26 of bladder 10 contains a radially oriented cord reinforcement 27. Cords 27 are continuous from bead 11 on one side of bladder 10 to the opposite bead 11 on the other side. The ends of reinforcement cords 27 are wrapped around beads 11 in a conventional manner familiar to those skilled in the art of constructing pneumatic tires. The center of the beads may contain additional reinforcement that is aligned in a hoop direction in the center of the bead. The planar surface of end 23 of bladder 20 is shown at 28 in FIGURE 3. Contained within bladder 20 are radially aligned reinforcement cords 29 which, similarly to the arrangement in bladder 10, terminate in overlapped relationship around bead reinforcement 30 of bead 31. Bead reinforcement 30 may be a single wire hoop formed by uniting the ends of a heavy gauge wire; however, it is not absolutely essential that any wire be utilized in order for the invention to function in a satisfactory manner. While the reinforcement in both bladders 10 and 20 have been illustrated preferably as a radially oriented cord reinforcement it is considered within the scope of the present invention to utilize reinforcement orientation other than radial and also to use non-continuous individual reinforcement elements such as flocked filamentary material throughout the bladder walls. The elastomeric material used in conjunction with the bladder construction is preferably rubber; however, many other synthetic materials such as a polyurethane can be used equally well. While the preferred embodiment of this invention utilizes an elastomer in bladder 20, it is possible to be fabricated without such material since it is not essential that it be fluid impervious.

FIGURE 4 is an enlarged section of the joined area between bladders 10 and 20. The reinforcement cords as previously mentioned can be positioned in one or more plies as shown in FIGURE 4 at 29 and 27 of bladders 10 and 20. The common juncture between bladders 10 and 20 can be made by joining their respective elastomeric surfaces prior to vulcanization. An additional way of fabricating an even stronger and more dimensionally stable joint is to intermingle by weaving or stitching together the reinforcement 29 with reinforcement 27 over the area where the bladders are joined together to produce a common wall which in the illustrations of this invention is of cylindrical configuration. When the fabrics are interwoven as above, care must be exercised so that the bladder can still expand radially when internal pressure is applied.

It will be readily apparent to those skilled in the art that configurations other than cylindrical can be achieved by varying the geometry of the reinforcement cords or material within bladder 20. FIGURE 4 also shows ridges or corrugations 32 positioned in the exterior elastomeric coating of bladder 10. Corrugations 32 will be explained immediately hereafter.

Going back to FIGURE 2, an air ingress line is illustrated at 33. Line 33 enters through end closure 12 and proceeds to an exit at 34. The air delivered at exit 34 can then travel circumferentially around corrugations 32 thus breaking the tire carcass from the building bladder. Heretofore much effort was expended in breaking the seal and freeing the tire from the tire building bladder.

FIGURE 5 shows another form that the invention may assume. Instead of a complete inner cylinder as represented in FIGURES 1–4, the radial tension members 35 and 36 can be attached as separate structural members by means of cylindrical sections 37 and 38 which may angle either axially outward or inward or may actually be anchored directly into the reinforcement structure of external bladder 10. In this instance sufficient reinforcement must be placed in the circumferential direction of bladder 10 so that it will retain a relatively flat external work surface.

While certain representative embodiments and details have been shown for the purpose of illustrating the invention, it will be apparent to those skilled in this art that various changes and modifications may be made therein without departing from the spirit or scope of the invention.

What is claimed is:

1. A tire building apparatus comprising a first bladder that is impervious to the passage of a fluid, a second bladder attached to the first bladder at the midpoint thereof in an axial direction, the ends of said first and second bladders terminating with circular bead portions, the beaded portions of said first bladder anchored in fluid impervious shaft mounted end closures that can be adjusted axially with respect to each other thus permitting a radial expansion of said first and second bladders when a pressurizing fluid is introduced into the cavity formed by the bladders and end closures, the beaded ends of said second bladder being free from any attaching means both in the unexpanded and expanded configuration whereby a dimensionally stable work surface is created exteriorly of said first bladder.

2. A tire building apparatus as claimed in claim 1 wherein said first and second bladders contain reinforcement cords that are parallelly oriented and are continuous from the bead at one end to the bead at the opposite end.

3. A tire building apparatus comprising a first bladder that is impervious to the passage of a fluid, a second bladder attached to the first bladder, said attachment between said first and second bladders occurring over a substantial extent in an axial direction and at the mid-section of said bladders, the ends of said first bladder terminating with bead rings adapted to be anchored in fluid impervious shaft mounted end closure elements that can be adjusted axially with respect to each other thus permitting a radial expansion of said first bladder when a pressurizing fluid is introduced into the cavity formed by said first bladder and its end closure elements, said second bladder having ends that are free from any attaching means and that assume a position substantially normal with respect to the axis of said first bladder when the apparatus is in the pressurized condition.

4. A tire building apparatus as claimed in claim 3 wherein the ends of said second bladder are circular and have a continuous reinforcement element embedded therein.

5. A tire building bladder comprising a fluid retaining first member of generally cylindrical configuration when in the unexpanded axially extended position, a second generally cylindrical member mounted circumferentially within and having an axis common with said first member, said first and second members united circumferentially together for a substantial axial extent, said members terminating on both ends with inextensible bead rings, the bead rings of said first member adapted to be clamped on a tire building drum so that the first member can be expanded into a toroidal configuration while the bead rings of said second member are unrestrained and can assume a stabilizing attitude with respect to said first member when the bladder is expanded to a toroidal configuration.

6. A bladder useful in the construction of pneumatic tires comprising a first envelope of elastomeric material having a generally cylindrical configuration that terminates at either end with a bead ring, a second generally cylindrical envelope having end sections and a central section positioned concentrically and interiorly of said first envelope, said first and second envelopes joined together at their respective center sections to form a common axially extending circumferential section that is restricted in its radial expansion by the end sections of said second envelope.

7. A tire building bladder comprising a fluid retaining first member of generally cylindrical configuration when in the axially extended position, said first member fabricated from an elastomer that contains therein at least one layer of axially extending parallelly oriented reinforcement cords that are continuous from a bead at one end of said first member to a bead at the opposite end of said first member, a second generally cylindrical member attached circumferentially to the interior of said first member such that the common juncture therebetween extends in an axial direction for a substantial distance, the second member containing therein a cord reinforcement that is axially oriented when the bladder is in the unexpanded condition, the cord reinforcement of said second member terminating at inextensible bead rings that are unrestrained in an axial direction so that they can assume a supporting position for controlling the contour of said first member.

8. A tire building apparatus comprising a first bladder of cylindrical configuration that is impervious to the passage of a fluid, a second generally cylindrical bladder positioned concentrically and interiorly with respect to said first bladder and attached circumferentially thereto along an axially extending mid-section, the ends of said first bladder terminating with bead protrusions that are anchored in fluid impervious end closures that are mounted on a common shaft and can be adjusted axially with respect to each other thus permitting the first bladder to assume a toroidal configuration, a reinforcement cord oriented in both of said bladders such that it is continuous in an axial direction from one end to the other end of the respective bladders, an axially extending hollow chamber positioned within the shaft and communicating with the cavity formed by the end closures and said first bladder thus facilitating the inflation of the tire building apparatus, an air line located within said cavity and having one end exiting through the walls of said bladders where they are joined together, the other end of said air line exiting through one of the end closures so that air can be introduced to a plurality of concentrically positioned grooves which form the exterior surface of the mid-section of said first bladder whereby a tire carcass can be broken loose from the tire building apparatus after it has been constructed.

9. A tire building bladder comprising a fluid impervious member of generally cylindrical configuration when in the unexpanded axially extended position, a reinforcement cord forming a part of the bladder and extending from end to end of the bladder, a plurality of spaced apart cord reinforced structural members attached to the interior wall of said bladder at the mid-section thereof so that they extend radially inwardly toward the axis of the bladder when the bladder is inflated to toroidal configuration, said structural members terminating at their radially innermost ends with bead rings that are unrestrained in an axial direction so that it can move axially as the bladder is deflated to its generally cylindrical configuration.

10. A tire building bladder comprising a fluid impervious member of generally cylindrical configuration when in the unexpanded axially extended position, a reinforcement cord forming a part of the bladder and extending from one end of the bladder to the opposite end of the bladder, at least one cord reinforced structural member anchored to the interior wall of said bladder at the mid-section thereof and extending radially inwardly toward the axis of the bladder when the bladder is inflated to a toroidal configuration, said structural member terminating at its radially innermost end with a bead ring that is unrestrained in an axial direction so that it can move axially as the bladder is deflated to its generally cylindrical configuration.

References Cited

UNITED STATES PATENTS

| 3,342,663 | 9/1967 | Pouilloux | 156—416 |
| 3,234,070 | 2/1966 | Pouilloux | 156—416 |
| 3,254,692 | 6/1966 | Travers | 152—340 |

FOREIGN PATENTS

| 621,063 | 5/1961 | Canada. |

HAROLD ANSHER, *Primary Examiner.*

UNITED STATES PATENT OFFICE
CERTIFICATE OF CORRECTION

Patent No. 3,386,875                                                June 4, 1968

Warren B. Grote

It is certified that error appears in the above identified patent and that said Letters Patent are hereby corrected as shown below:

Column 1, line 25, insert the following paragraph:

The foregoing abstract is not to be taken as limiting the invention of this application, and in order to understand the full nature and extent of the technical disclosure of this application, reference must be made to the accompanying drawings and the following detailed description.

Signed and sealed this 24th day of November 1970.

(SEAL)
Attest:

EDWARD M. FLETCHER, JR.                      WILLIAM E. SCHUYLER, JR.
Attesting Officer                              Commissioner of Patents